US012538381B2

(12) United States Patent
Buthler et al.

(10) Patent No.: US 12,538,381 B2
(45) Date of Patent: Jan. 27, 2026

(54) FLEXIBLE ASSIGNMENT OF TX-CENTRIC OR RX-CENTRIC DRX CONFIGURATION IN SIDELINK COMMUNICATIONS

(71) Applicant: Nokia Technologies Oy, Espoo (FI)

(72) Inventors: Jakob Lindbjerg Buthler, Aalborg (DK); Berthold Panzner, Holzkirchen (DE)

(73) Assignee: Nokia Technologies Oy, Espoo (FI)

( * ) Notice: Subject to any disclaimer, the term of this patent is extended or adjusted under 35 U.S.C. 154(b) by 377 days.

(21) Appl. No.: 18/274,062

(22) PCT Filed: Dec. 23, 2021

(86) PCT No.: PCT/EP2021/087539
§ 371 (c)(1),
(2) Date: Jul. 25, 2023

(87) PCT Pub. No.: WO2022/156994
PCT Pub. Date: Jul. 28, 2022

(65) Prior Publication Data
US 2024/0373500 A1    Nov. 7, 2024

Related U.S. Application Data

(60) Provisional application No. 63/141,026, filed on Jan. 25, 2021.

(51) Int. Cl.
*H04W 4/00* (2018.01)
*H04W 28/02* (2009.01)
*H04W 76/28* (2018.01)
*H04W 92/18* (2009.01)

(52) U.S. Cl.
CPC ....... *H04W 76/28* (2018.02); *H04W 28/0268* (2013.01); *H04W 92/18* (2013.01)

(58) Field of Classification Search
USPC ......................................... 370/328, 329, 330
See application file for complete search history.

(56) References Cited

U.S. PATENT DOCUMENTS

2024/0057122 A1 *    2/2024    Lee ................... H04W 72/1263

OTHER PUBLICATIONS

ETSI MCC, "Report of 3GPP TSG RAN2#112-e meeting, Online," 3GPP TSG-RAN WG2 meeting #113-e, R2-2100001, Nov. 2-13, 2020.

(Continued)

*Primary Examiner* — Chuong T Ho
(74) *Attorney, Agent, or Firm* — Barta Jones, PLLC (57) ABSTRACT

A first user equipment able to communicate with other user equipments via sidelink communications determines a procedure to use for selecting a host of a coordination of sidelink discontinuous reception when receiving a connection request from a second user equipment, and based on whether a requirement for a flow corresponding to the connection request meets a threshold. The first user equipment then performs sidelink discontinuous reception coordination between the first and second user equipment based on the determined host. The first user equipment sends configuration a second user equipment to use for discontinuous reception for the sidelink communications, or it requests help from a second user equipment to perform alignment of discontinuous reception for the sidelink communications.

20 Claims, 6 Drawing Sheets (56) References Cited

OTHER PUBLICATIONS

Lenovo et al., "Coordination between Uu DRX and SL DRX," 3GPP TSG-RAN WG2 Meeting #113, R2-2100931, Jan. 25-Feb. 5, 2021.

Lenovo et al., "Discontinuous reception and transmission in SL," 3GPP TSG-RAN WG2 Meeting #112, R2-2009696, Nov. 2-13, 2020.

Lenovo et al., "Discussion on sidelink resource allocation enhancements," 3GPP TSG-RAN WG2 Meeting #113, R2-2101116, Jan. 25-Feb. 5, 2021.

* cited by examiner

FLEXIBLE ASSIGNMENT OF TX-CENTRIC OR RX-CENTRIC DRX CONFIGURATION IN SIDELINK COMMUNICATIONS

CROSS REFERENCE TO RELATED APPLICATION

This patent application is a U.S. National Stage application of International Patent Application Number PCT/EP2021/087539 filed Dec. 23, 2021, which claims priority to U.S. Provisional Application No. 63/141,026 filed Jan. 25, 2021, which are hereby incorporated by reference in their entireties.

TECHNICAL FIELD

Exemplary embodiments herein relate generally to communications between user equipment in a wireless network and, more specifically, relate to discontinuous reception (DRX) configuration in sidelink.

BACKGROUND

Abbreviations that may be found in the specification and/or the drawing figures are defined below, at the end of the detailed description section.

In typical wireless, and in particular cellular, communications, a user equipment (UE) connects to the wireless network through a base station. There are, however, new communication schemes that allow communication directly between UEs. In particular, the sidelink is a special kind of communication mechanism between UEs without going through a base station, but still able to be aided by the network.

In more detail, in sidelink, there are typically two modes: Mode 1, where the network will assign the resources for the direct communication, i.e., the UE requests a resource, and is granted the resource by the network; and Mode 2, where the UE autonomously can select resources based on sensing. These modes allow communication to occur between UEs, but with also some control by the network.

Sidelink is an enabler for device-to-device (D2D) and vehicle-to-everything (V2X). There are many uses for these technologies. These may be used to improve network capacity or extend coverage for UEs (D2D), or for road safety (V2X), for instance, such as if a group of vehicles slows down quickly based on an accident ahead.

While sidelink communications have benefits, many UEs have to address power issues, e.g., due to being battery-powered. One technique being explored for the sidelink is discontinuous reception (DRX), which provides opportunities for communications by the UEs and also opportunities for the UEs to enter a low-power mode.

In order for sidelink DRX over PC5 to work as intended, the sidelink UEs that are to communicate need to be aware of which DRX pattern the transmitting UE is using, in order to be able to receive the data over PC5. PC5 is an interface for sidelink communications, and sidelink DRX is a new release (Rel.) 17 work item (WI). One of the main aspects discussed in third generation partnership project (3GPP) meetings at the current stage, is how the coordination between transmitting and receiving sidelink UEs is to work in order to be aware of the same terminology for DRX. It has also been discussed that sidelink (SL) DRX coordination may be supported by higher layers (in a communication protocol stack), and that this coordination is based on, i.e., the specific type of service and a (pre) configured SL DRX cycle. However, whether the coordination is via the transmitting UE or the receiving UE is up for debate.

BRIEF DESCRIPTION OF THE DRAWINGS

In the attached Drawing Figures:

FIG. 2 (split over FIGS. 2A, 2B, and 2C) is a logic flow diagram for flexible assignment of TX-centric or RX-centric DRX configuration in sidelink communications, in accordance with an exemplary embodiment.

DETAILED DESCRIPTION OF THE DRAWINGS

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

The exemplary embodiments herein describe techniques for Flexible Assignment of TX-Centric or RX-Centric DRX Configuration in Sidelink Communications. Additional description of these techniques is presented after a system into which the exemplary embodiments may be used is described.

Figure 1:
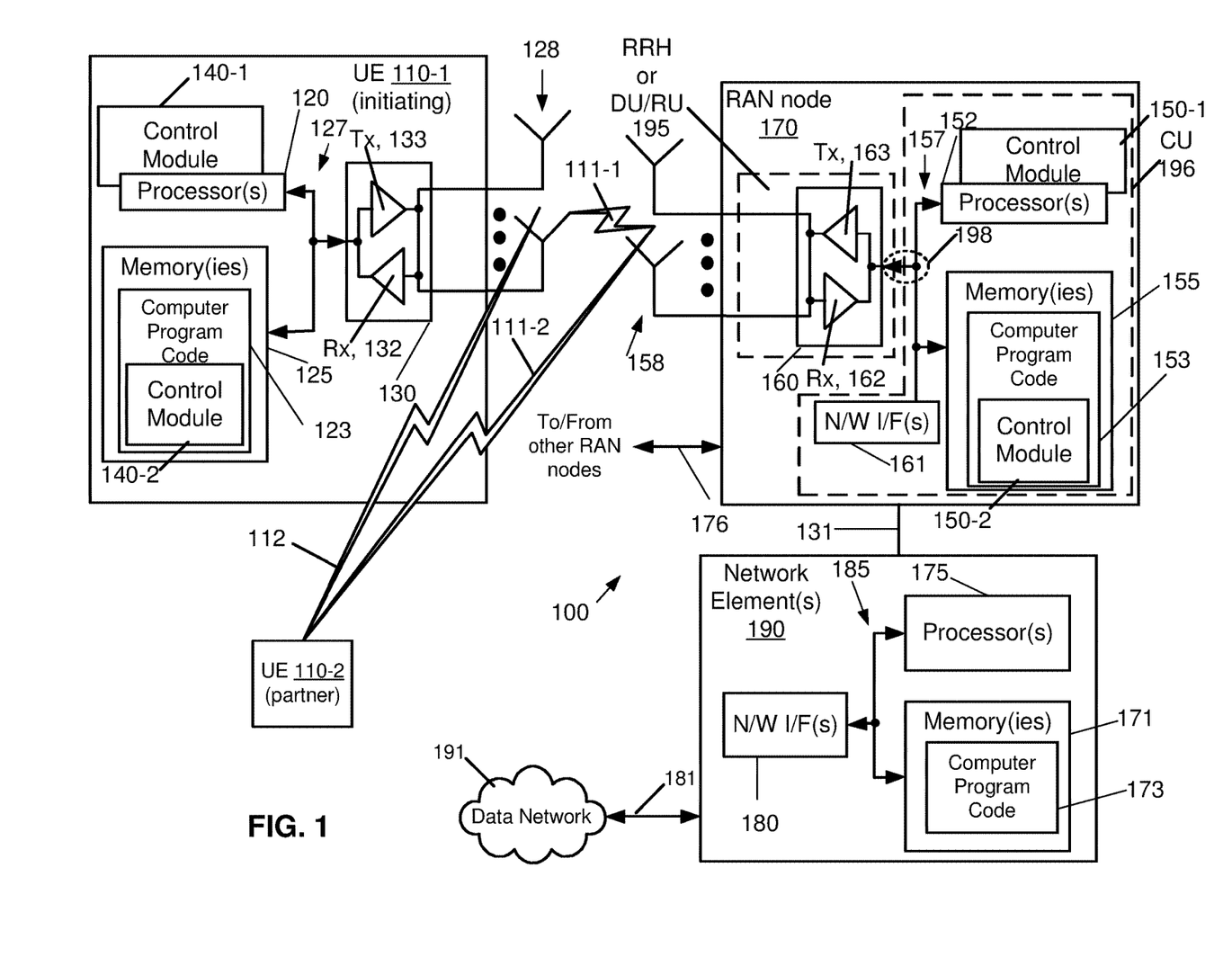
FIG. 1 is a block diagram of one possible and non-limiting exemplary system in which the exemplary embodiments may be practiced.

Turning to FIG. 1, this figure shows a block diagram of one possible and non-limiting exemplary system in which the exemplary embodiments may be practiced. Two user equipment (UEs) 110-1 and 110-2, a radio access network (RAN) node 170, and network element(s) 190 are illustrated. In FIG. 1, two UEs 110-1 and 110-2 are in wireless communication with a wireless network 100. A UE 110 is a wireless, typically mobile device that can access a wireless network. In the examples herein, UE 110-1 may be referred to as an initiating UE (typically a Tx UE, but could also be an Rx UE), and UE 110-2 may be referred to as a peer UE (typically, an Rx UE, but may also be a Tx UE). The UE 110-1 connects to the RAN node 170 via the wireless link 111-1, and the UE 110-2 connects to the RAN node 170 via the wireless link 111-2. The wireless links 111 may be accessed using a Uu interface. The two UEs 110-1 and 110-2 communicate using the sidelink 112, which may be accessed using a PC5 interface. It should be noted that in sidelink, the two UEs 110 can connect, even though they may be devices without a (e.g., current) Uu connection (i.e., if they are using Mode 2, described previously).

The two UEs 110-1 and 110-2 will be treated herein as being similar, such as having the same internal circuitry. Thus, the internal organization and circuitry of only UE 110-1 is described here. The UE 110-1 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110-1 includes a control module 140, comprising one of or both parts 140-1 and/or 140-2, which may be implemented in a number of ways. The control module 140 may be implemented in hardware as control module 140-1, such as being implemented as part of the one or more processors 120. The control module 140-1 may be implemented also as an integrated circuit or through other hardware such as a programmable gate array. In another example, the control module 140 may be implemented as control module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

The RAN node 170 is a base station that provides access by wireless devices such as the UE 110 to the wireless network 100. In the exemplary embodiments described below, the RAN node 170 is referred to as gNB 170, but this is merely one example. For instance, the RAN node 170 may be a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (e.g., the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting RRC, SDAP and PDCP protocols of the gNB or RRC and PDCP protocols of the gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by one gNB-DU. The gNB-DU terminates the F1 interface 198 connected with the gNB-CU. Note that the DU 195 is considered to include the transceiver 160, e.g., as part of an RU, but some examples of this may have the transceiver 160 as part of a separate RU, e.g., under control of and connected to the DU 195. The RAN node 170 may also be an eNB (evolved NodeB) base station, for LTE (long term evolution), or any other suitable base station.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a control module 150, comprising one of or both parts 150-1 and/or 150-2, which may be implemented in a number of ways. The control module 150 may be implemented in hardware as control module 150-1, such as being implemented as part of the one or more processors 152. The control module 150-1 may be implemented also as an integrated circuit or through other hardware such as a programmable gate array. In another example, the control module 150 may be implemented as control module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the control module 150 may be distributed, such as being distributed between the DU 195 and the CU 196, or be implemented solely in the DU 195.

The one or more network interfaces 161 communicate over a network such as via the links 176 and 131. Two or more RAN nodes 170 communicate using, e.g., link 176. The link 176 may be wired or wireless or both and may implement, e.g., an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, e.g., fiber optic cable or other suitable network connection to connect the other elements (e.g., a central unit (CU), gNB-CU) of the RAN node 170 to the RRH/DU 195. Reference 198 also indicates those suitable network link(s).

The wireless network 100 may include a network element or elements 190 that may include core network functionality, and which provides connectivity via a link or links 181 with a data network 191, such as a telephone network and/or a data communications network (e.g., the Internet). Such core network functionality for 5G may include access and mobility management function(s) (AMF(s)) and/or user plane functions (UPF(s)) and/or session management function(s) (SMF(s)). Such core network functionality for LTE may include MME (Mobility Management Entity)/SGW (Serving Gateway) functionality. These are merely exemplary functions that may be supported by the network element(s) 190, and note that both 5G and LTE functions might be supported. The RAN node 170 is coupled via a link 131 to a network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor-based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general-purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, vehicles with a modem device for wireless V2X (vehicle-to-everything) communication, image capture devices such as digital cameras having wireless communication capabilities, gaming devices having wireless communication capabilities, music storage and playback appliances having wireless communication capabilities, Internet appliances (including Internet of Things, IoT, devices) permitting wireless Internet access and possibly browsing, IoT devices with sensors and/or actuators for automation applications with wireless communication tablets with wireless communication capabilities, as well as portable units or terminals that incorporate combinations of such functions.

Having thus introduced one suitable but non-limiting technical context for the practice of the exemplary embodiments, the exemplary embodiments will now be described with greater specificity.

As previously indicated, it has been discussed that sidelink (SL) DRX coordination may be supported by higher layers (in a communication protocol stack), and that this coordination is based on, i.e., the specific type of service and a (pre) configured SL DRX cycle. However, whether the coordination is via the transmitting UE or the receiving UE is up for debate. This is indicated, i.e., by proposal P5 in TDoc R2-2009413, which triggered a discussion in RAN2 whether the SL DRX configuration shall be TX-centric or RX-centric. See R2-2009413, Huawei, HiSilicon, "Consideration on the sidelink DRX for unicast, groupcast and broadcast", 3GPP TSG-RAN WG2 Meeting #112 electronic, 2-13 Nov. 2020.

One of the reasons for this discussion is that in Uu (the interface for the wireless link 111 between a UE 110 and the RAN node 170), the Uu DRX is naturally decided by a single common entity, being the gNB. Over PC5, the natural assumption for most agreements is that everything is Tx-centric, however such an assumption brings issues as described below.

One such issue is as follows. One exemplary difference between Uu and SL DRX is that between a pair of two, or more, sidelink UEs, multiple PC5 links can exist. Further, within a single PC5 link, multiple PC5 flows can exist. This means that the assumption that SL DRX configuration is based on a single link is not valid. Assuming that multiple PC5 links exist, the decision between whether to have a Tx- or Rx-centric SL DRX configuration is not a trivial one.

As a further issue, it may be that for the single configuration/link, the initiating (e.g., Tx) UE is neither in an RRC_CONNECTED state over Uu, nor has the UE any other PC5 links, whereas the peer (e.g., Rx) UE may have multiple PC5 links, and may be in the RRC_CONNECTED state over Uu. Depending on how the SL DRX configuration is finally decided, it may be that the SL DRX configuration from either of the sidelink UEs may provide an ineffective behavior for the other. For instance, it may be that the SL DRX cycle configured from either of the UEs is too strict (e.g., too many SL DRX-ON periods) compared to what is required by the QoS per PC5 flow. This may lead to the other sidelink UE waking up unnecessarily too many times, causing unnecessary power consumption. Note that a SL DRX-ON period is an "ON-period" where the UE is receiving sidelink and in high power.

The exemplary embodiments herein suggest multiple solutions so as to handle this and other problems. First, an introduction is provided, then additional details are provided.

It is noted that the term "sidelink assistance information" is used herein. This is not to be mistaken to be any Uu related assistance information, but rather an expected, possibly new, message to be included in communications and, e.g., defined in a standard. The actual name of this message is currently unknown, but there is consensus that there will need to be alignment between UEs as to make this sidelink DRX work item function properly. Since there has to be a message exchange between the UEs, one may either piggy-back the information described herein on other messages (new or old) or implement a new message specifically for this.

The inventors have also realized that, while the assumption for most agreements is that everything is Tx-centric for sidelink, this may not be true in some or many situations. The reason being that in sidelink, communications may have a bidirectional link, hence concentrating only on Tx may miss some of these links. Sidelink DRX will most likely be decided at the connection setup, which means that when there is any description herein of a UE that begins the decision process described herein, this means between the UE that wants to initiate the connection, and the intended "receiver(s)" for the set up of this connection.

Given this realization, the following terminology is used herein. The UE that starts a process to communicate with another UE over sidelink is referred to as the initiating UE. The UE being contacted in the process, and the UE to which the initiating UE starts the process, is referred to as the peer UE. The UE to determine the final SL DRX configuration is in this document denoted as the SL DRX "host".

The exemplary embodiments herein propose how to decide on the SL DRX coordination between an initiating UE and a peer UE, instead of simply just providing sidelink assistance information back and forth.

Assuming the Rx UE (as the peer UE) is to provide sidelink assistance information, the Rx UE 110-2 will at first need to be requested this type of information. This means that the sidelink assistance information needs to be requested beforehand (i.e., prior to SL DRX configuration over sidelink), possibly causing latency in the SL DRX configuration setup. Even if the sidelink assistance information is sent by the Tx UE (as the initiating UE 110-1), leaving the Rx UE to decide on the actual SL DRX period, some communication delay may be inevitable.

An exemplary embodiment herein proposes to add a level of intelligence to the SL DRX "host" selection process, optimizing the method for selecting down to the level of making decisions on when a flow is of high enough priority (as one example of a requirement the flow), and this enables decisions for sidelink DRX as follows:

Option 1. Sidelink DRX configuration to be decided initially by the initiating (e.g., Tx) UE.

Option 2. Sidelink DRX configuration to be decided (and, e.g., acknowledged) by the peer (e.g., Rx) UE.

Decision by the peer (e.g., Rx) UE, potentially also assisted by the initiating UE.

Option 3. Sidelink DRX configuration to be assisted by the peer UE, but decided by the initiating UE.

It is noted that this exemplary embodiment includes only two UEs for the sidelink communications. This does not exclude sidelink communications between three or more UEs, but for ease of reference, two UEs are used herein.

It is further noted that while the initiating and peer terminology is used herein, the initiating UE 110-1 is typically referred to as the initiating (e.g., Tx) UE and the peer UE 110-2 is typically referred to as the peer (e.g., Rx) UE. This is because the general assumption, as described above, is the Tx UE starts the process. This is not limiting, however, and, as also previously described, the Rx UE may start the process.

For the above, option 1 provides the lowest latency for the SL DRX configuration, at a potential cost of lowest flexibility. Meanwhile, option 2 provides a higher level of flexibility at a potential cost of latency and the fact that the initiating UE compromises, whereas option 3 provides the highest amount of flexibility both for the initiating and peer UE, at the highest potential latency cost of the three options. The options therefore provide differing latencies and flexibilities, and the initiating UE 110-1 and peer UE 110-2 can perform a process to choose one of the options.

To achieve this, a novel information element (denoted herein as sl-DRX-AlignmentPriority, as an example) may be used, as one possibility, and (pre) configured at the sidelink UEs 110, whose value or set of values determine(s) which of the three above options are best suited for UEs in the sidelink communication link to follow when setting up the sidelink communication link 112. It may also be that the sidelink assistance information is added to the UE capability report exchange within the setup of the link.

Now that an introduction is provided, additional details are provided.

Note that as stated above, the sidelink assistance information is not to be mistaken with the UEAssistanceInformation used in the Uu connection over the links 111.

Note also that the SL-DRX-ConfigurationRequest described herein may not only contain the values described in the exemplary techniques presented here, but may also contain general parameters related to sidelink DRX configuration like on-duration, DRX period, off duration, inactivity timer, and the like. This is similarly true for the SL-DRX-ConfigurationComplete message and the SL-DRX-ConfigurationAcceptance message. It is also noted that the names for these messages are merely exemplary, and other names may be used. The information may, i.e., also be carried using the existing UE capability report(s) exchanged during connection setup.

Here, a detailed flow of an exemplary embodiment is presented, along with additional implementations described below. It is noted that it is not about sending sidelink assistance information in exemplary embodiments herein, but instead about determining whether to opt for a configuration procedure and which one to use.

Figures 2, 2A:
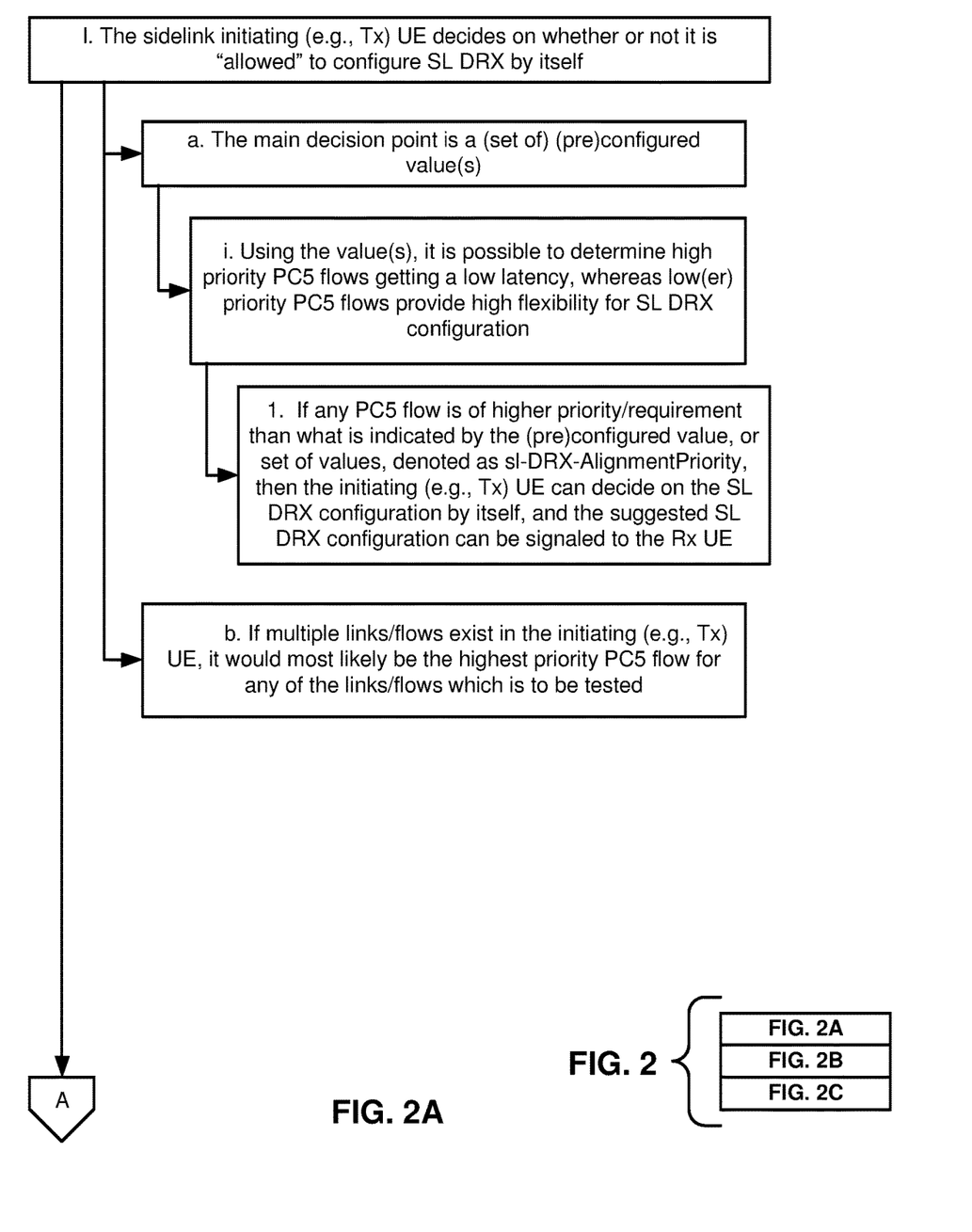
Figure 2B:
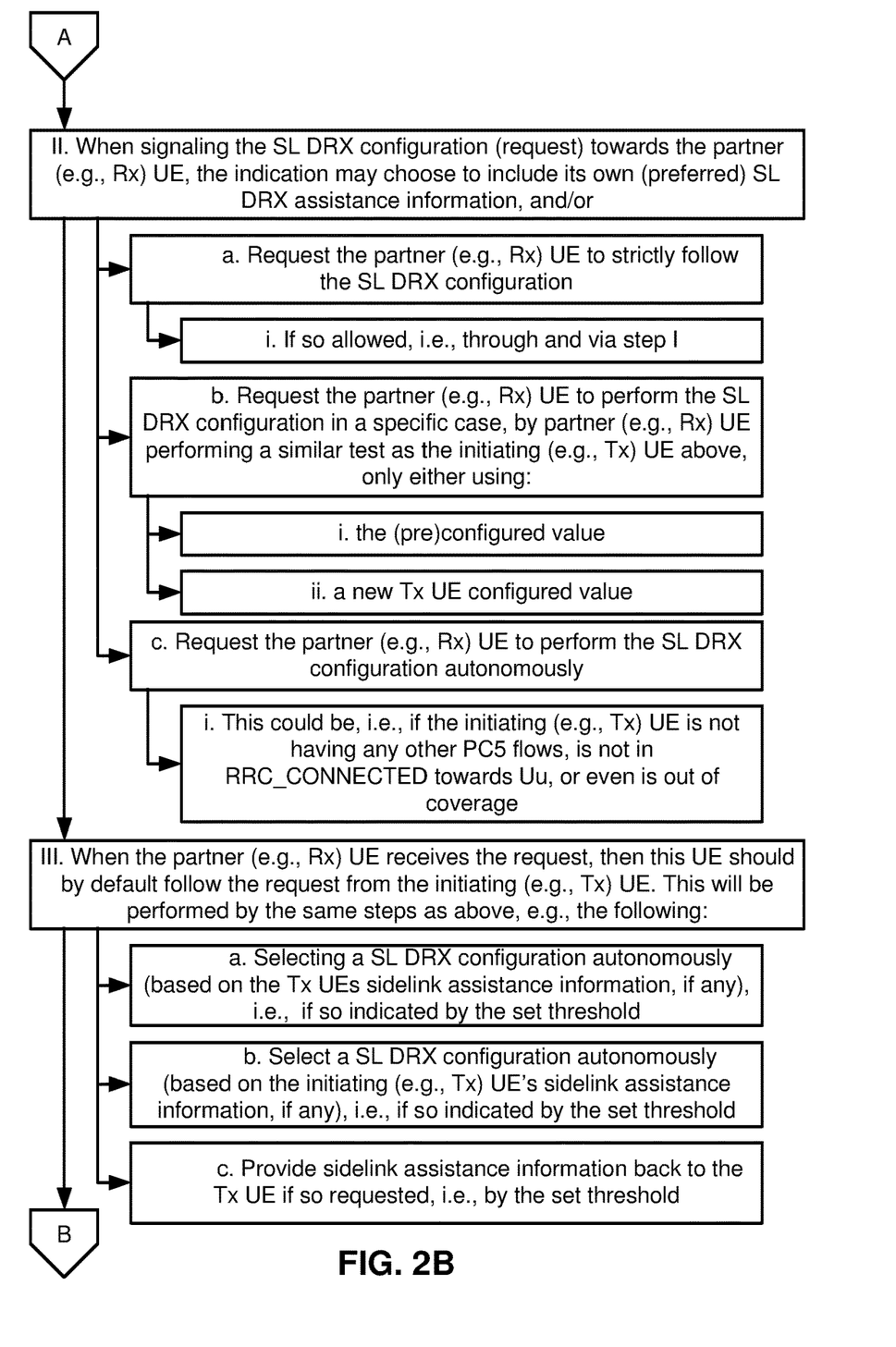
Figure 2C:
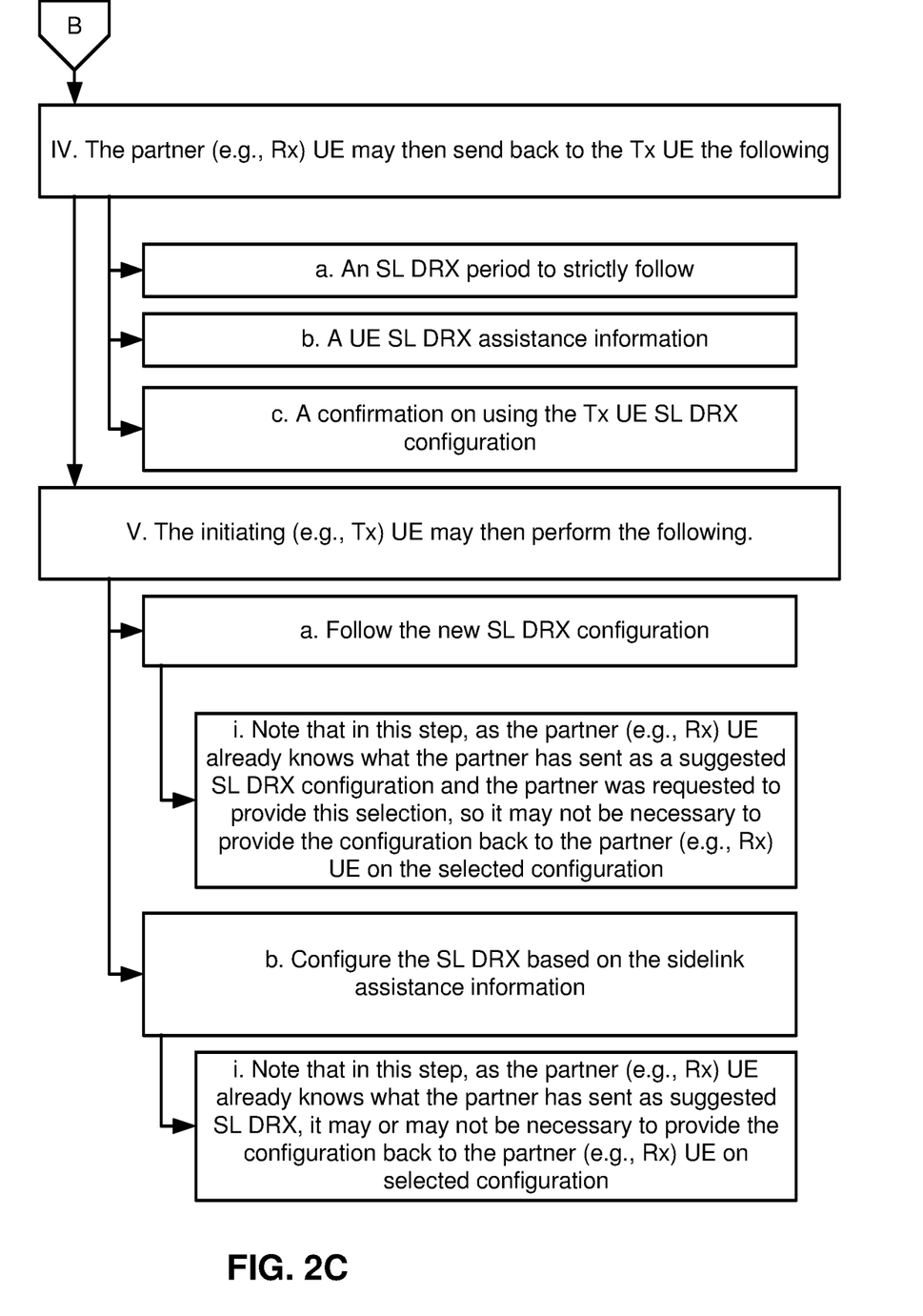

The detailed flow is presented through FIG. 2 in part. FIG. 2 is split over FIGS. 2A, 2B, and 2C, and is a logic flow diagram for flexible assignment of TX-centric or RX-centric SL DRX configuration in sidelink communications, in accordance with an exemplary embodiment. This figure also illustrates the operation of an exemplary method, a result of execution of computer program instructions embodied on a computer readable memory, functions performed by logic implemented in hardware, and/or interconnected means for performing functions in accordance with an exemplary embodiment. The steps in the logic flow diagram can be performed by a UE 110 (110-1 or 110-2) under control of a corresponding control module 140. The initiating UE 110-1 is the initiating UE and the peer UE 110-2 is the peer UE in this example.

I. First of all, the sidelink initiating (e.g., Tx) UE decides on whether or not it is "allowed" to configure SL DRX by itself.

a. The main decision point is a (set of) (pre) configured value(s), denoted herein as sl-DRX-AlignmentPriority (which name is merely exemplary) and could be, but is not limited to one or more of, e.g., a priority value of the PC5 flow, another PC5 QoS profile indicating a value or set of values, a value indicating the minimum SL DRX OnDuration, a value or set of values indicating the maximum SL DRX OffDuration or others.

i. Using the value(s), it is possible to determine high priority PC5 flows getting a low latency (e.g., meaning option 1 above may be selected), whereas low(er) priority PC5 flows provide high flexibility for SL DRX configuration (e.g., meaning option 2 or 3 might be selected).

1. If any PC5 flow is of higher priority/requirement than what is indicated by the (pre) configured value, or set of values, denoted as sl-DRX-AlignmentPriority, then the initiating (e.g., Tx) UE can decide on the SL DRX configuration by itself, and the suggested SL DRX configuration can be signaled to the peer (e.g., Rx) UE. This is option 1 above, and the initiating UE 110-1 is the SL DRX host.

b. If multiple links/flows exist in the initiating (e.g., Tx) UE, it would most likely be the highest priority PC5 flow for any of the links/flows which is to be tested.

II. Secondly, when signaling the SL DRX configuration (request) towards the peer (e.g., Rx) UE, the initiating UE 110-1 may choose to include its own (e.g., preferred) SL DRX assistance information, and/or one of the following:

a. Request the peer (e.g., Rx) UE to strictly follow the SL DRX configuration. In this case, the initiating UE is the SL DRX host, and this is option 1.

i. If so allowed, i.e., through and via step I, described above.

b. Request the peer (e.g., Rx) UE to perform the SL DRX configuration in a specific case, by the peer (e.g., Rx) UE performing a similar test as the initiating (e.g., Tx) UE above, using:

i. the (pre) configured value; or ii. a new initiating (e.g., Tx) UE configured value. Having the initiating (e.g., Tx) UE also able to send such an overwriting value towards the peer UE would solve some cases where the (pre) configured value is very low, but the highest priority flow at the initiating UE is quite high. Here, the Tx UE may then provide a stricter value by which the peer UE can make its decision.

II.b is option 2, and either the initiating UE 110-1 or the peer UE 110-2 is the SL DRX host.

c. Request the peer (e.g., Rx) UE to perform the SL DRX configuration autonomously. This may be used for option 2.

i. This could be, i.e., if the initiating (e.g., Tx) UE is not having any other PC5 flows, is not in RRC_CONNECTED towards Uu, or even is out of coverage.

III. When the peer (e.g., Rx) UE receives the request, then this UE should by default follow the request from the initiating (e.g., Tx) UE. This will be performed by the same steps as above, e.g., the following:

a. Start using the SL DRX configuration set by the initiating (e.g., Tx) UE. This is option 1, and the initiating UE 110-1 is the SL DRX host.

b. Select an SL DRX configuration autonomously (based on the initiating (e.g., Tx) UE's sidelink assistance information, if any), i.e., if so indicated by the set threshold. This is option 3, and the peer UE 110-2 is the SL DRX host.

c. Provide sidelink assistance information back to the Tx UE if so requested, i.e., by the set threshold. This may be for option 2.

IV. The peer (e.g., Rx) UE may then send back to the Tx UE the following.

a. An SL DRX period to strictly follow. This may be for options 2 or 3.

b. A UE SL DRX assistance information. This may be for options 2 or 3.

c. A confirmation on using the Tx UE SL DRX configuration. This may be for options 1 or 2.

V. The initiating (e.g., Tx) UE may then perform the following.

a. Follow the new SL DRX configuration. In this case, the peer UE is the SL DRX host.

i. Note that in this step, as the peer (e.g., Rx) UE already knows that the peer has been sent a suggested SL DRX configuration and the peer was requested to provide this selection, it may not be necessary to provide the configuration back to the peer (e.g., Rx) UE on the selected configuration.

b. Configure the SL DRX based on the sidelink assistance information. In this case, the initiating UE is the SL DRX host. This may be for option 2.

i. Note that in this step, as the peer (e.g., Rx) UE already knows the peer has been sent a suggested SL DRX, it may or may not be necessary to provide the configuration back to the peer (e.g., Rx) UE on selected configuration.

It is additionally noted that emphasis herein is placed on priority of the flow for the requested set up (e.g., higher priority indicating a lower latency requirement). However, other requirements might be used, such as QoS or any other requirement of a PC5 flow. These are additional examples of possible requirements:

ProSe Per-Packet Priority (PPPP);

presence of public safety related identifiers such as PSID/ITS-AID;

parameters related/associated to an area/geographical region;

V2X message type (e.g., PSM, personal safety message, for pedestrians, CAM cooperative awareness message); and/or parameters (related to vehicular safety) being defined in SAE International J3161, J2735, J2945 (Society of Automotive Engineers International standard for cellular-V2X).

Additionally, a combination of requirements is also possible, and each requirement could have a corresponding threshold.

Figure 3:
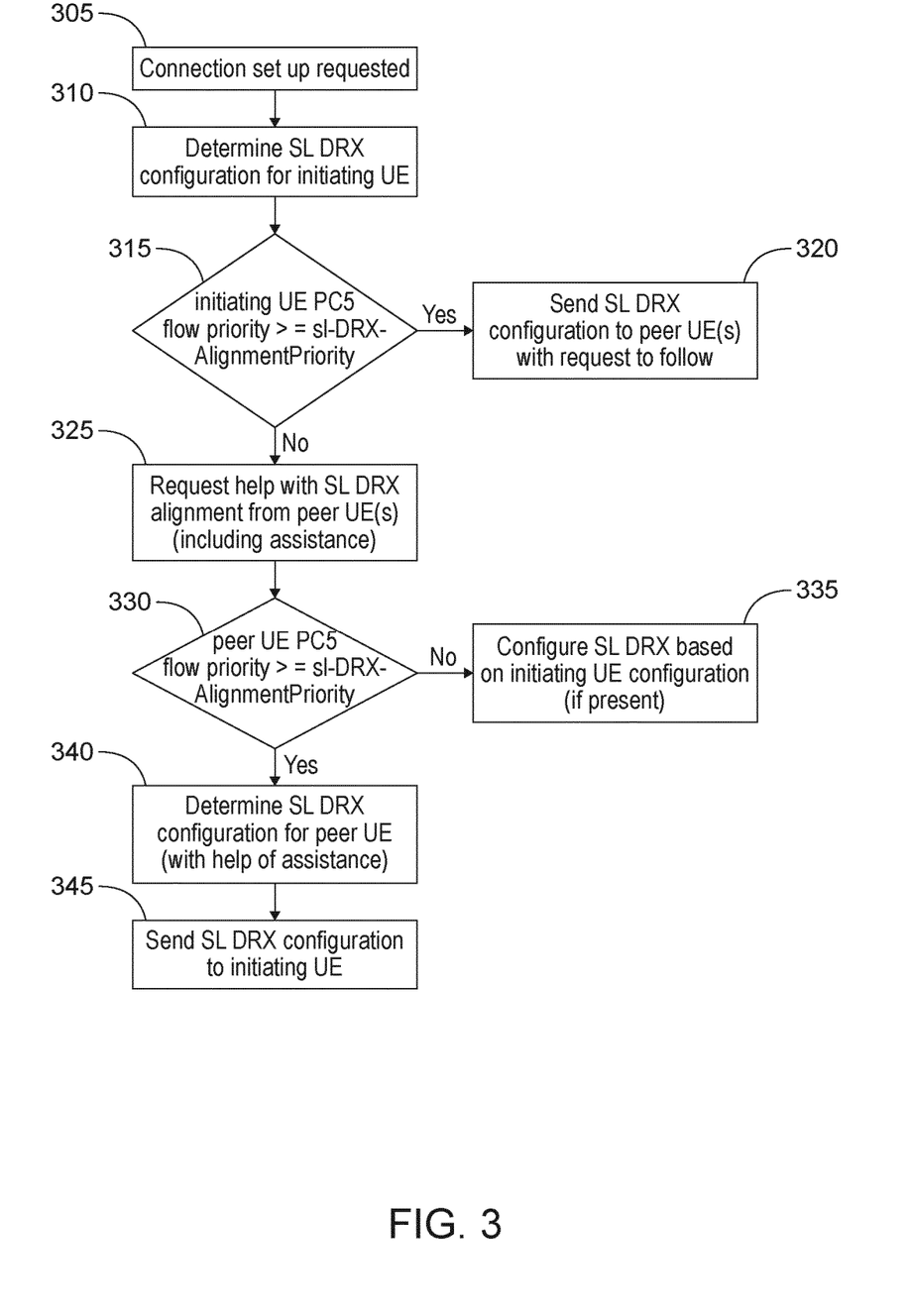
FIGS. 3 and 4 are logic flow diagrams of exemplary implementations of the embodiments.
Figure 4:
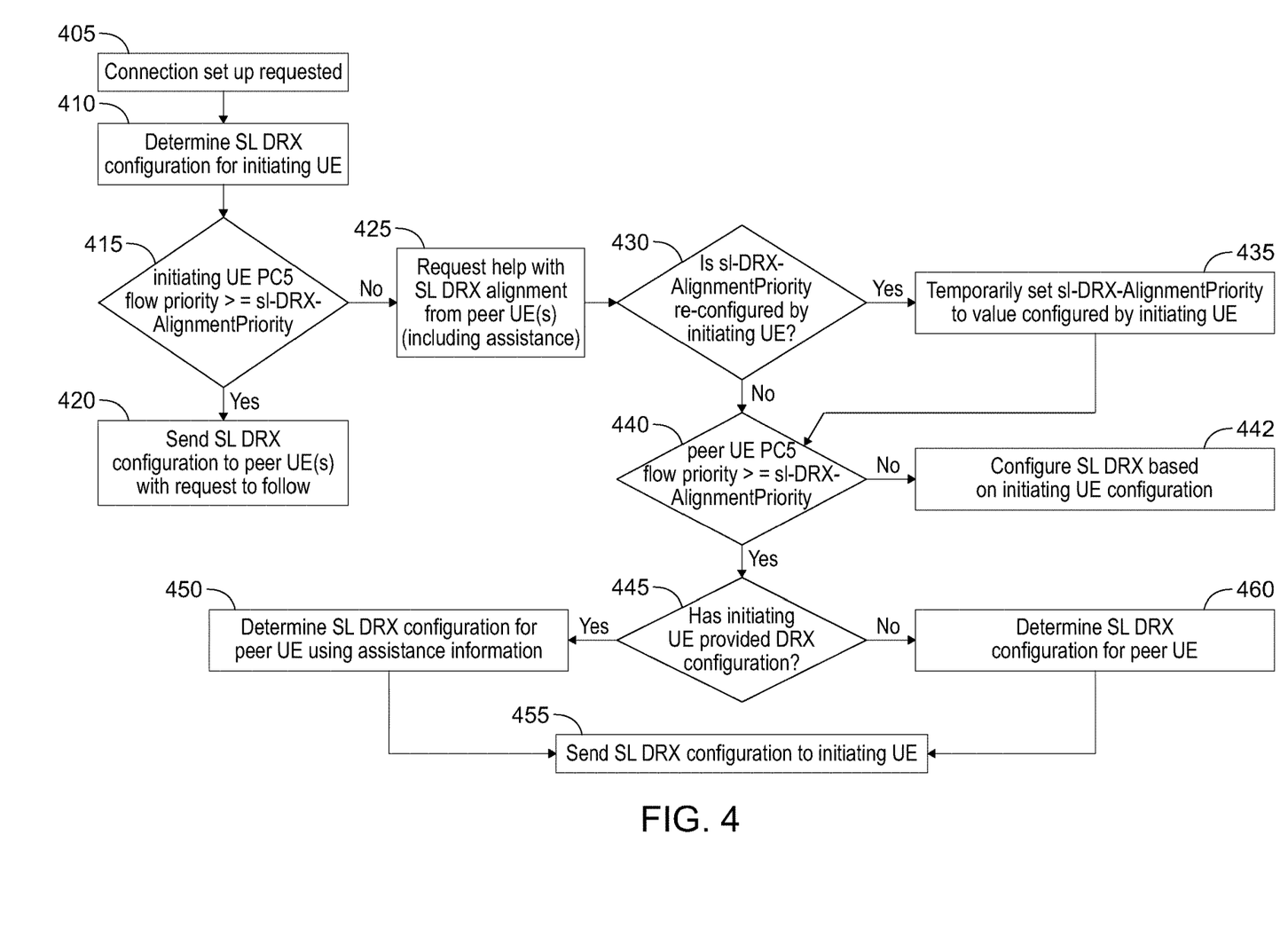

FIGS. 3 and 4 are logic flow diagrams of exemplary implementations of the embodiments. These figures also illustrate the operation of exemplary methods, results of execution of computer program instructions embodied on a computer readable memory, functions performed by logic implemented in hardware, and/or interconnected means for performing functions in accordance with exemplary embodiments. The steps in the logic flow diagrams can be performed by a UE 110 (110-1 or 110-2) under control of a corresponding control module 140. FIG. 3 is an example with a basic flow, and FIG. 4 adds additional possible details.

Turning to FIG. 3, in block 305, the initiating UE 110-1 determines that a connection setup is requested, e.g., by an application. The initiating UE 110-1 in block 310 determines an SL DRX configuration for the initiating UE. This determination could be based on, e.g., the highest priority flow, QoS, or the like. In block 315, the initiating UE 110-1 determines whether a PC5 flow priority>=sl-DRX-AlignmentPriority. That is, the information element sl-DRX-AlignmentPriority includes (at least) a value, and block 315 determines whether the PC5 flow priority for the requested flow is higher than the value. See I.a, I.a.i, and I.a.i.1 of FIG. 2 for additional information.

If the PC5 flow priority is greater than or equal to sl-DRX-AlignmentPriority (block 315=yes), the method proceeds to block 320, where the initiating UE 110-1 sends an SL DRX configuration to peer UE(s) 110-2 with a request to follow the SL DRX configuration. If the PC5 flow priority is less than sl-DRX-AlignmentPriority (block 315=no), the method proceeds to block 325. In this block, the initiating UE 110-1 requests help with SL DRX alignment from the peer UE(s) 110-2 (including SL assistance).

It should be noted that the "greater than or equal to" or the "less than" can also be modified. For instance, A≥B, where B is x, can be modified to A>B by making B=(x+1). The A≥B (or A>B, or any similar equations) can be encompassed by the phrase that A meets a threshold (B), and not meeting the threshold can mean A<B (or A≤B or any similar equations).

In block 330, the peer UE 110-2 determines whether the PC5 flow priority (for the requested flow)>=sl-DRX-AlignmentPriority. If the PC5 flow priority is less than a value of the sl-DRX-AlignmentPriority (block 330=no), the method proceeds to block 335, where the peer UE(s) 110-2 configures SL DRX based on the configuration from the initiating UE 110-1 (if present). It is noted that there are multiple options if the configuration is not present. In the case of the flowchart, this could be considered as not defined, and hence would be a false configuration. In another case, not providing a configuration could implicitly indicate that the UE is allowed to decide by itself the configuration.

Otherwise, if the PC5 flow priority>=sl-DRX-AlignmentPriority (block 330=yes), in block 340, the peer UE 110-2 determines an SL DRX for the peer UE(s) 110-2 (with the help of assistance). In block 345, the peer UE 110-2 sends the SL DRX configuration to the initiating UE 110-1.

With respect to FIG. 4, as described above, this adds additional possible details over FIG. 3. In particular, this add that the peer UE first checks whether the initiating UE has requested a different value of the threshold value (e.g., sl-DRX-AlignmentPriority). Also, the peer UE also checks whether there is any configuration from the initiating UE as to determine whether to use the provided assistance information. This further illustrates that the initiating UE may implicitly indicate requests such as "please use assistance information", by simply providing assistance information.

FIG. 4 begins in block 405, where a connection setup is requested in the initiating UE 110-1. The initiating UE 110-1 determines a SL DRX configuration for the initiating UE 110-1, in block 410.

The initiating UE 110-1 in block 415 determines whether the PC5 flow priority (corresponding to the connection request)>=sl-DRX-AlignmentPriority. If yes, the method proceeds to block 420, where the initiating UE 110-1 sends an SL DRX configuration to the peer UE(s) 110-2 with a request to following this configuration. This is option 1 and the initiating UE 110-1 is the SL DRX host.

If the PC5 flow priority is less than the sl-DRX-AlignmentPriority (block 415=no), in block 425, the initiating UE 110-1 requests help with SL DRX alignment from the peer UE(s) 110-2 (including assistance). In block 430, the peer UE(s) 110-2 determines if sl-DRX-AlignmentPriority has been re-configured by the initiating UE. If so (block 430=yes), in block 435, the peer UE(s) 110-2 temporarily sets sl-DRX-AlignmentPriority to the value configured by the initiating UE and the method proceeds to block 440.

If sl-DRX-AlignmentPriority has not been re-configured by the initiating UE (block 430=No) or block 435 has been performed, the peer UE(s) 110-2 in block 440 determines whether PC5 flow priority>=sl-DRX-AlignmentPriority. If not (the PC5 flow priority<sl-DRX-AlignmentPriority), the method proceeds to block 442, where the peer UE 110-2 configures SL DRX based on the initiating UE 110-1 configuration.

If the PC5 flow priority>=sl-DRX-AlignmentPriority (block 440=yes), the peer UE 110-2 in block 445 determines whether the initiating UE has provided an SL DRX configuration. If so (block 445=yes), the method proceeds to block 450, where the peer UE 110-2 determines the SL DRX configuration for the peer UE using assistance information. This could be used for option 2. If no (block 445=no), the method proceeds to block 460, where the peer UE 110-2 determines the SL DRX configuration for the peer UE. This could be used for option 3.

Block 455 is reached from either block 450 or 460. In block 455, the peer UE 110-2 sends the SL DRX configuration to the initiating UE 110-1.

The following should be noted.

A) When the Tx UE in part I of the method in FIG. 2 requests the Rx UE to decide on a SL DRX configuration, or requests sidelink assistance information, the Tx UE may also:

A.1) provide its own sidelink assistance information; or
  A.2) provide an alternative value or set of values in sl-DRX-AlignmentPriority for which the Rx UE shall use to decide.

B) The sidelink assistance request may be implicit, or explicitly introduced in a coordination message.

C) In another embodiment, the modification of the SL DRX cycle is performed within a certain set of the following:

C.1) restrictions sent by the initiating UE (or (pre) configured); or
  C.2) SL DRX configurations sent by the initiating UE.

D) In another embodiment, the decision in the Tx/Rx UE may also be based on the UE's (Uu) RRC state, as if the Tx UE is in RRC_CONNECTED to the network, it may be of benefit to have the SL DRX aligned with the Uu DRX.

Without in any way limiting the scope, interpretation, or application of the claims appearing below, a technical effect and/or an advantage of one or more of the example embodiments disclosed herein is that these make it possible for both the Tx and Rx UE to be able to decide on the sidelink DRX configuration, instead of determining it on an either/or base. This will make it more flexible when setting SL DRX configuration, as to ensure that an optimal configuration can be met by both the Rx and Tx UE.

Furthermore, the testing of priority allows for low latency connection setup for high priority/QoS class flows, instead of, i.e., Tx UE to always needing to request assistance, and then send an SL DRX configuration. On top of low latency, one can also ensure QoS fulfillment of the sidelink flow(s) for both UEs.

Also, the exemplary embodiments allow for better power consumption performance if high priority flows are not present. The decision above is made on (pre) configured values, allowing more control on when either UE decides. The initiating (e.g., Tx) UE is allowed to overwrite the priority value, controlling when the initiating (e.g., Tx) UE wants the peer (e.g., Rx) UE to decide, or whether the initiating (e.g., Tx) UE just wants assistance.

As used in this application, the term "circuitry" may refer to one or more or all of the following:

(a) hardware-only circuit implementations (such as implementations in only analog and/or digital circuitry) and
  (b) combinations of hardware circuits and software, such as (as applicable): (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

3GPP third generation partnership project
5G fifth generation
5GC 5G core network
AMF access and mobility management function
CU central unit
DRX discontinuous reception
DU distributed unit
eNB (or eNodeB) evolved Node B (e.g., an LTE base station)
EN-DC E-UTRA-NR dual connectivity
E-UTRA evolved universal terrestrial radio access, i.e., the LTE radio access technology
gNB (or gNodeB) base station for 5G/NR, i.e., a node providing NR user plane and control plane protocol terminations towards the UE, and connected via the NG interface to the 5GC
I/F interface
LTE long term evolution
MAC medium access control
MME mobility management entity
ng or NG next generation
ng-eNB or NG-eNB next generation eNB
NR new radio
N/W or NW network
PDCP packet data convergence protocol
PHY physical layer
RAN radio access network
Rel or Rel. release
RLC radio link control
RRH remote radio head
RRC radio resource control
RU radio unit
Rx or RX receiver or reception
SDAP service data adaptation protocol
SGW serving gateway
SL sidelink
SMF session management function
TS technical specification
Tx or TX transmitter or transmission
QOS quality of service
UE user equipment (e.g., a wireless, typically mobile device)
UPF user plane function
WI work item

The invention claimed is:

1. A first user equipment (UE), comprising:
at least one processor; and
at least one non-transitory memory storing instructions that, when executed with the at least one processor, cause the first UE configured as an initiating UE to communicate with at least one peer UE using a PC5 sidelink interface to perform the following:
receiving a connection setup request corresponding to a PC5 flow;
determining whether a priority of the PC5 flow is greater than or equal a pre-configured value of an information element denoted as sidelink discontinuous reception alignment priority (sl-DRX-AlignmentPriority);
responsive to determining that the PC5 flow priority meets the sl-DRX-AlignmentPriority, transmitting to the peer UE, a sidelink discontinuous reception (SL DRX) configuration for the peer UE to follow for the sidelink communications; and
responsive to determining that the PC5 flow priority does not meet the sl-DRX-AlignmentPriority, transmitting to the peer UE, a request for assistance in aligning the SL DRX for the sidelink communications, wherein the peer UE is enabled to determine the SL DRX configuration based at least in part on the request.

2. The first UE of claim 1, wherein the request for assistance transmitted to the peer UE includes sidelink assistance information comprising: a preferred SL DRX configuration, and a value overwriting the pre-configured value of the sl-DRX-AlignmentPriority.

3. The first UE of claim 2, wherein the SL DRX configuration transmitted comprises one or more parameters selected from the group consisting of: on-duration, DRX period, off-duration, and an inactivity timer.

4. The first UE of claim 3, wherein the determining of whether the PC5 flow priority meets the sl-DRX-AlignmentPriority is further based on a quality-of-service (QoS) profile of the PC5 flow.

5. The first UE of claim 4, wherein the first UE is configured to overwrite the pre-configured value of the sl-DRX-AlignmentPriority with a stricter value transmitted to the peer UE for use in deciding the SL DRX configuration.

6. The first UE of claim 5, wherein the request for assistance from the initiating UE to the peer UE is implicit by including sidelink assistance information without an explicit coordination message.

7. The first UE of claim 6, wherein the first UE is further caused to determine the SL DRX configuration further based on a radio resource control (RRC) state of the initiating UE with respect to a Uu connection, such that if the initiating UE is in RRC_CONNECTED, the SL DRX configuration is aligned with a Uu DRX configuration.

8. A system comprising:
a first user equipment (UE):
at least one processor; and
at least one non-transitory memory storing instructions that, when executed with the at least one processor, cause the first UE configured as an initiating UE to communicate with at least one peer UE using a PC5 sidelink interface to perform the following:

receiving a connection setup request corresponding to a PC5 flow;

determining whether a priority of the PC5 flow is greater than or equal to a pre-configured value of an information element denoted as sidelink discontinuous reception alignment priority (sl-DRX-AlignmentPriority);

responsive to determining that the PC5 flow priority meets the sl-DRX-AlignmentPriority, transmitting to the peer UE, a sidelink discontinuous reception (SL DRX) configuration for the peer UE to follow for the sidelink communications; and responsive to determining that the PC5 flow priority does not meet the sl-DRX-AlignmentPriority, transmitting to the peer UE, a request for assistance in aligning the SL DRX for the sidelink communications, wherein the peer UE is enabled to determine the SL DRX configuration based at least in part on the request.

9. The system of claim 8, wherein the request for assistance transmitted to the peer UE includes sidelink assistance information comprising: a preferred SL DRX configuration, and a value overwriting the pre-configured value of the sl-DRX-AlignmentPriority.

10. The system of claim 9, wherein the SL DRX configuration transmitted comprises one or more parameters selected from the group consisting of: on-duration, DRX period, off-duration, and an inactivity timer.

11. The system of claim 10, wherein the determining of whether the PC5 flow priority meets the sl-DRX-AlignmentPriority is further based on a quality-of-service (QoS) profile of the PC5 flow.

12. The system of claim 11, wherein the first UE is configured to overwrite the pre-configured value of the sl-DRX-AlignmentPriority with a stricter value transmitted to the peer UE for use in deciding the SL DRX configuration.

13. The system of claim 12, wherein the request for assistance from the initiating UE to the peer UE is implicit by including sidelink assistance information without an explicit coordination message.

14. The system of claim 13, wherein the first UE is further caused to determine the SL DRX configuration further based on a radio resource control (RRC) state of the initiating UE with respect to a Uu connection, such that if the initiating UE is in RRC_CONNECTED, the SL DRX configuration is aligned with a Uu DRX configuration.

15. A method performed by a first user equipment (UE) configured as an initiating UE to communicate with at least one peer UE using a PC5 sidelink interface, the method comprising:

receiving, at the initiating UE, a connection setup request corresponding to a PC5 sidelink flow;

determining, at the initiating UE, whether a priority of the PC5 sidelink flow is greater than or equal to a pre-configured value of an information element denoted as sidelink discontinuous reception alignment priority (sl-DRX-AlignmentPriority);

responsive to determining that the PC5 flow priority meets the sl-DRX-AlignmentPriority, transmitting, from the initiating UE to the peer UE, a sidelink discontinuous reception (SL DRX) configuration for the peer UE to follow for the sidelink communications; and responsive to determining that the PC5 flow priority does not meet the sl-DRX-AlignmentPriority, transmitting, from the initiating UE to the peer UE, a request for assistance in aligning the SL DRX for the sidelink communications, wherein the peer UE is enabled to determine the SL DRX configuration based at least in part on the request.

16. The method of claim 15, wherein the request for assistance transmitted to the peer UE includes sidelink assistance information comprising: a preferred SL DRX configuration, and a value overwriting the pre-configured value of the sl-DRX-AlignmentPriority.

17. The method of claim 16, wherein the SL DRX configuration transmitted comprises one or more parameters selected from the group consisting of: on-duration, DRX period, off-duration, and an inactivity timer.

18. The method of claim 17, wherein the determining of whether the PC5 flow priority meets the sl-DRX-AlignmentPriority is further based on a quality-of-service (QoS) profile of the PC5 sidelink flow.

19. The method of claim 18, wherein the initiating UE overwrites the pre-configured value of the sl-DRX-AlignmentPriority with a stricter value transmitted to the peer UE for use in deciding the SL DRX configuration.

20. The method of claim 19, wherein the request for assistance from the initiating UE to the peer UE is implicit by including sidelink assistance information without an explicit coordination message.

* * * * *